(12) United States Patent
Cai et al.

(10) Patent No.: US 8,792,857 B2
(45) Date of Patent: Jul. 29, 2014

(54) NOTIFICATION OF CHARGING RATE ADJUSTMENTS IN REGIONS OF A MOBILE NETWORK TO CONTROL BANDWIDTH USAGE IN THE REGIONS

(75) Inventors: Yigang Cai, Naperville, IL (US); Xiangyang Li, Beijing (CN)

(73) Assignee: Alcatel Lucent, Boulogne Billancourt (FR)

( * ) Notice: Subject to any disclaimer, the term of this patent is extended or adjusted under 35 U.S.C. 154(b) by 394 days.

(21) Appl. No.: 13/320,108

(22) PCT Filed: Jun. 1, 2009

(86) PCT No.: PCT/US2009/045862
§ 371 (c)(1),
(2), (4) Date: Nov. 11, 2011

(87) PCT Pub. No.: WO2010/141009
PCT Pub. Date: Dec. 9, 2010

(65) Prior Publication Data
US 2012/0064858 A1   Mar. 15, 2012

(51) Int. Cl.
*H04M 11/00* (2006.01)
*H04M 3/42* (2006.01)

(52) U.S. Cl.
USPC .................. 455/408; 455/406; 455/414.1

(58) Field of Classification Search
CPC .................. H01M 2/30; H02J 7/00
USPC ................................................ 455/408
See application file for complete search history.

(56) References Cited

U.S. PATENT DOCUMENTS

| | | | |
|---|---|---|---|
| 2006/0030291 A1* | 2/2006 | Dawson et al. | 455/405 |
| 2006/0172721 A1 | 8/2006 | Dawson et al. | |
| 2013/0031279 A1* | 1/2013 | Venugopal et al. | 710/18 |

FOREIGN PATENT DOCUMENTS

| | | |
|---|---|---|
| WO | WO9737503 | 10/1997 |
| WO | WO9965183 | 12/1999 |
| WO | WO9966706 | 12/1999 |

* cited by examiner

*Primary Examiner* — Olumide T Ajibade Akonai
*Assistant Examiner* — Natasha Cosme
(74) *Attorney, Agent, or Firm* — Duft Bornsen & Fettig, LLP (57) ABSTRACT

Systems and methods are disclosed that notify end users of mobile devices of charging rate adjustments within a mobile network. A rate notification system receives bandwidth usage data for the mobile network, and identifies a region within the mobile network having a bandwidth usage that exceeds a threshold. The bandwidth usage is processed per media type (i.e., voice calls, text messages, etc) based on the bandwidth usage data. The rate notification system then identifies a mobile device located within the region, and identifies one or more contacts of the end user of the mobile device. The rate notification system then identifies an adjusted charging rate per contact per media type for this end user, and provides the adjusted charging rates to the end user of the mobile device.

18 Claims, 5 Drawing Sheets

NOTIFICATION OF CHARGING RATE ADJUSTMENTS IN REGIONS OF A MOBILE NETWORK TO CONTROL BANDWIDTH USAGE IN THE REGIONS

RELATED APPLICATIONS

This application is the National Stage under 35 U.S.C. 371 of International Application No. PCT/US2009/045862, filed Jun. 1, 2009, which is incorporated by reference herein.

BACKGROUND

1. Field of the Invention

The invention is related to the field of communications and, in particular, to bandwidth usage in mobile networks.

2. Statement of the Problem

Mobile networks, such as CDMA networks or GSM networks, are used for communication through a variety of media types. For example, the mobile networks are commonly used for voice calls, email, text messaging, multimedia messaging, Instant Messaging (IM), etc. To allow for effective communications, service providers design and implement the mobile networks to have a high enough bandwidth capacity. The service providers would optimally like to utilize a significant portion of the bandwidth of the mobile network without overloading the mobile network. An optimal utilization of the bandwidth of the mobile network results in the service providers obtaining high revenues without undue congestion or Quality of Service (QoS) issues.

One problem encountered by service providers is that certain regions of a mobile network may encounter periods of inactivity where the bandwidth usage is below some desired threshold. For example, one or more regions may have reduced bandwidth usage during late evenings, on Thursday mornings, on the last five days before a billing period, etc. These periods of inactivity represent lost revenue to the service providers.

Another problem is overloading regions of a mobile network. For example, if there is a big event in a town (e.g., a Presidential inauguration), then this region of the mobile network may be overloaded with voice calls, picture messages, text messages, etc. When regions of the mobile network become overloaded, the switches or other network elements handling these regions may shut down causing a temporary loss of communications.

It may be desirable to control bandwidth utilization of a mobile network by influencing how the end users of the mobile network initiate communications.

SUMMARY

Embodiments described herein are able to notify end users in regions of a mobile network of adjusted charging rates. The notifications are intended to influence whether or not the end users initiate communications in these regions. For instance, if the bandwidth usage in a region is below a threshold, then end users in this region may be notified of a reduced charging rate to encourage the end users to initiate communications. If the bandwidth usage in a region is above a threshold (i.e., approaching overload), then end users in this region may be notified of an increased charging rate to discourage the end users from initiating communications. By notifying the end users of the adjusted charging rates, the bandwidth usage in particular regions of the mobile network can be raised or lowered over a time period. Thus, service providers can advantageously maintain more optimal bandwidth usage across the mobile network, which increases revenue to the service provider while avoiding overload conditions.

In one embodiment, a rate notification system is implemented in a mobile network to notify end users of mobile devices of charging rate adjustments. The rate notification system includes an interface system and a control system. The interface system is operable to receive bandwidth usage data for a mobile network. The bandwidth usage data includes media type descriptions indicating the media used to consume or use the bandwidth of the mobile network. For example, the bandwidth usage data may indicate the number of voice calls handled, the number of text messages handled, the number of multimedia messages handled, etc. The control system is operable to identify a region within the mobile network having a bandwidth usage that exceeds a threshold for one or more media types based on the bandwidth usage data. For example, the control system may identify a region that has low bandwidth usage for voice calls, or may identify a region that has high bandwidth usage for text messages. The control system is further operable to identify a mobile device located in the region, and identify one or more contacts of the end user of the mobile device. For example, the contacts of an end user may be identified from a contact list, a network-based phonebook, etc. The control system is further operable to identify an adjusted charging rate for communicating with one or more of the contacts using the media type(s). The interface system is further operable to provide the adjusted charging rates to the mobile device so that the end user may view the adjusted charging rates. This may occur for multiple contacts of the end user, and for multiple media types. Thus, rate notification system provides adjusted charging rates per contact per media type for the mobile device found to be located in the region of the mobile network. Based on the adjusted charging rates, the end user of the mobile device can decide whether or not to initiate communications with one or more of the contacts.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
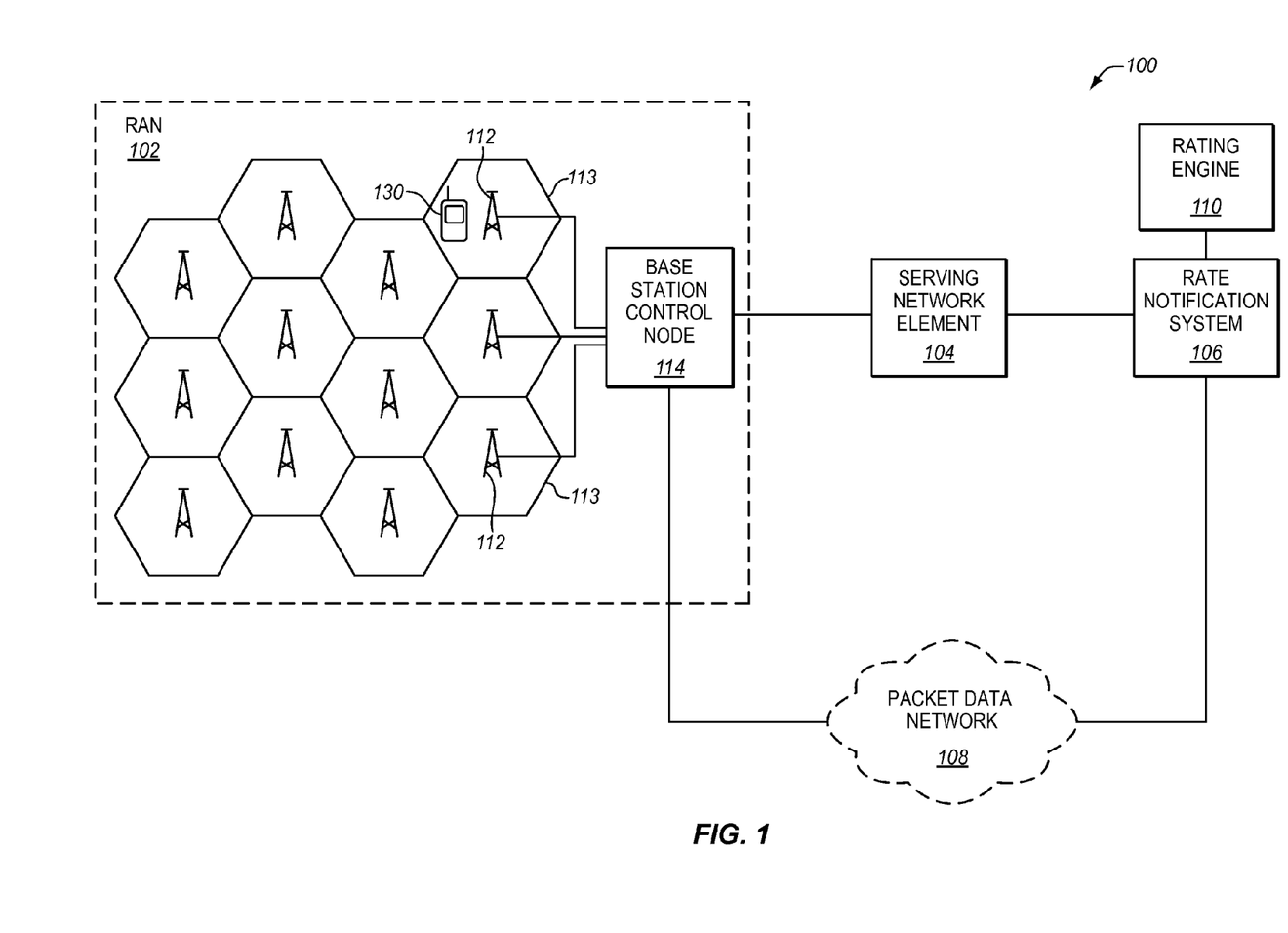
FIG. 1 illustrates a mobile network in an exemplary embodiment.

FIG. 1 illustrates a mobile network 100 in an exemplary embodiment. Mobile network 100 comprises any network that provides mobile communications, such as a GSM network, a CDMA network, a UMTS network, etc. Mobile network 100 includes a Radio Access Network (RAN) 102, a serving network element 104, a rate notification system 106, and a rating engine 110. RAN 102 comprises any radio or wireless network that interfaces a mobile device with a core network (represented by serving network element 104 in FIG. 1). In this embodiment, RAN 102 includes a plurality of base stations 112 each providing a service area referred to as a cell 113. Base stations 112 are each connected to base station control node 114, which is operable to manage and control the functions of base stations 112. One example of base station control node 114 comprises a Base Station Controller (BSC). Those skilled in the art will appreciate that RAN 102 may include many more base stations 112 than illustrated in FIG. 1. There may be one or more mobile devices within the service area of RAN 102, one of which is illustrated in FIG. 1 as mobile device 130. Mobile device 130 comprises any device operable to communicate via wireless signals, such as a mobile phone, a PDA, a PC, a mobile VoIP phone, etc.

Base station control node 114 connects to serving network element 104 over some type of circuit-switched or packet-switched backhaul network (not shown). Serving network element 104 represents a core network, such a GSM Public Land Mobile Network (PLMN), an IP Multimedia Subsystem (IMS) network, etc. Serving network element 104 comprises any switch, server, or other device in the core network that serves mobile devices to setup and tear down sessions. For instance, serving network element 104 may comprise an MSC in a circuit-switch network (e.g., GSM PLMN), or may comprise a Call Session Control Function (CSCF) in a packet-switched IMS network.

Serving network element 104 further connects to rate notification system 106. Rate notification system 106 comprises any system, server, or component operable to notify end users of mobile devices of charging rate adjustments. Rate notification system 106 is able to identify one or more regions within mobile network 100 having low bandwidth usage or high bandwidth usage, and notify one or more mobile devices within the region(s) of an adjusted charging rate for communications via different media types (e.g., voice call, email, text message, multimedia message, Instant Message (IM)). A more thorough description of the operation of rate notification system 106 is described in relation to FIG. 3.

Base station control node 114 and rate notification system 106 also connect to a packet data network 108. A packet data network 108 comprises any packet-switched network that transports data (as opposed to voice). Although not shown, base station control node 114 may connect to packet data network 108 through another node, such as a Packet Data Serving Node (PDSN) in a CDMA/EVDO network, an SGSN/GGSN in a GSM/UMTS network, or a S-GW/PDN-GW in an LTE/EPC network.

Rate notification system 106 also connects to rating engine 110. Rating engine 110 comprises any device, system, or server operable to generate a charging rate for a communication, such as a charging rate for a voice call, a text message, a multimedia message, etc. Rating engine 110 may be a standalone element as illustrated in FIG. 1, or may be implemented within another network element, such as in serving network element 104, or in an charging application (not shown).

Figure 2:
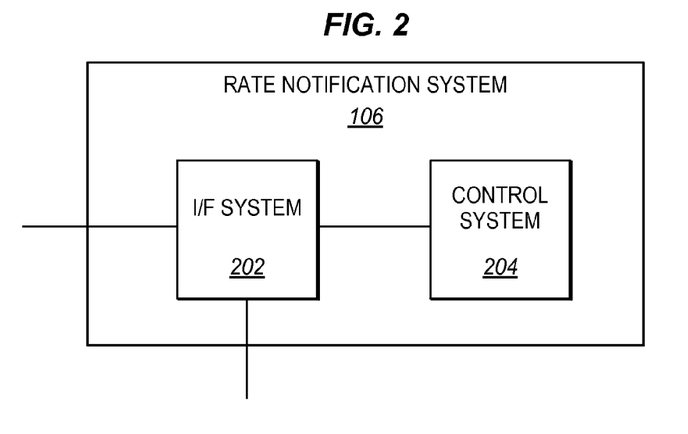
FIG. 2 illustrates a rate notification system in an exemplary embodiment.

FIG. 2 illustrates rate notification system 106 in an exemplary embodiment. In this embodiment, rate notification system 106 includes an interface system 202 and a control system 204. Interface system 202 comprises any device, component, or system operable to transmit and receive data regarding bandwidth usage in a mobile network. Control system 204 comprises any device, component, or system operable to process bandwidth usage data, and notify mobile devices of charging rate adjustments based on the bandwidth usage data.

In FIG. 1, assume for the following embodiments that mobile communications are occurring within mobile network 100. For example, mobile devices within the service area of RAN 102 may be placing or receiving voice calls, exchanging email, exchanging text messages, exchanging multimedia messages, exchanging IM's, etc. Base station control node 114 and/or base stations 112 collect or generate data that indicates utilization of bandwidth within mobile network 100. The data that indicates utilization of bandwidth is referred to herein as bandwidth usage data. The bandwidth usage data may be defined by "media type". In other words, the bandwidth usage data includes a media type description indicating the media used to consume or use the bandwidth. The bandwidth usage data may thus be processed to identify bandwidth utilization per media type. For example, the bandwidth usage data may include a number of voice calls per minute, where the media type is "voice call". In another example, the bandwidth usage data may include a number of text messages handled per minute, where the media type is "text message". This bandwidth usage data is thus available to other systems of mobile network 100, such as rate notification system 106.

Figure 3:
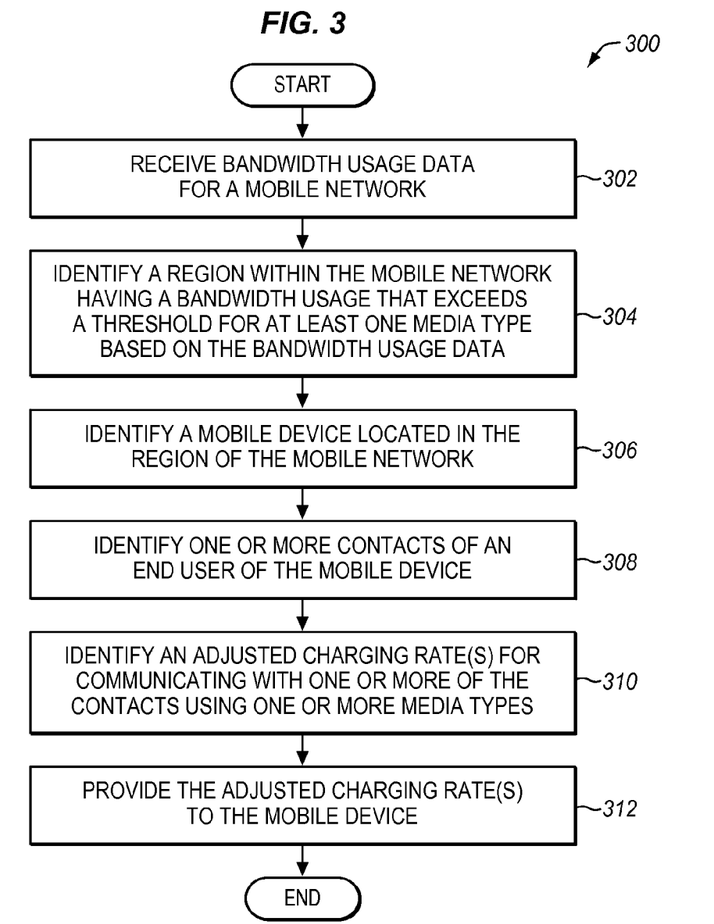
FIG. 3 is a flow chart illustrating a method of notifying end users of mobile devices of charging rate adjustments in an exemplary embodiment.

FIG. 3 is a flow chart illustrating a method 300 of notifying end users of mobile devices of charging rate adjustments in an exemplary embodiment. The steps of method 300 will be described with reference to mobile network 100 in FIG. 1 and rate notification system 106 in FIG. 2, but those skilled in the art will appreciate that method 300 may be performed in other networks and systems. Also, the steps of the flow chart in FIG. 3 are not all inclusive and may include other steps not shown, and the steps may be performed in an alternative order.

In step 302, interface system 202 (of rate notification system 106) receives bandwidth usage data for mobile network 100. Interface system 202 may receive the bandwidth usage data from serving network element 104, base station control node 114, base stations 112, and/or another system not shown in FIG. 1. For example, base station control node 114 and other base station control nodes (not shown) may store bandwidth usage data for each region they serve. The base station control nodes may then report the bandwidth usage data to serving network element 104, where the bandwidth usage data indicates usage per media type. Serving network element 104 may then report the bandwidth usage data to rate notification system 106.

In step 304, control system 204 identifies a region within mobile network 100 having a bandwidth usage that exceeds a threshold based on the bandwidth usage data. A region comprises any area or zone within the service area of mobile network 100 having a particular bandwidth usage (e.g., a low usage or high usage). As an example, a region may comprise the area served by the plurality of base stations 112 shown in FIG. 1. A region may alternatively comprise the area served by a single base station 112 shown in FIG. 1.

The region is identified based on bandwidth usage that exceeds a threshold "per media type". For example, control system 204 identifies a region having a bandwidth usage for voice calls that exceeds a threshold for voice calls, identifies a region having a bandwidth usage for text messages that exceeds a threshold for text messages, etc. The bandwidth usage that is identified for the region may be a low bandwidth usage or a high bandwidth usage. For example, a service provider may define a threshold for a minimum bandwidth usage, and may define a threshold for a maximum bandwidth usage. Control system 204 may then monitor mobile network 100 based on the bandwidth usage data to identify if a region of mobile network 100 reaches or exceeds the minimum bandwidth usage or the maximum bandwidth usage. Those skilled in the art will appreciate that control system 204 may identify multiple regions within mobile network 100 having a bandwidth usage that exceeds a threshold.

Responsive to control system 204 identifying a region within mobile network 100 that has a bandwidth usage that exceeds a threshold, control system 204 determines whether the region is eligible for a charging rate adjustment. Control system 204 may process rules and policies defined by the service provider to determine whether or not certain regions are eligible for charging rate adjustments. If the region is eligible, then control system 204 identifies a mobile device (such as mobile device 130 in FIG. 1) located in the region in step 306. Control system 204 may identify that mobile device 130 is located within the identified region in a variety of ways. For example, control system 204 may query a location server (not shown) to identify that mobile device 130 is located within the region. Alternatively, the bandwidth usage data may indicate that mobile device 130 is located within the region. Those skilled in the art will appreciate that control system 204 may identify multiple mobile devices located within the region of mobile network 100.

In step 308, control system 204 identifies one or more contacts of an end user of the mobile device 130. A contact comprises a person or entity having information defined which allows the end user to communicate with the person or entity, such as a name, email address, physical address, directory number, and/or other pertinent information. Contacts are generally stored in what is referred to as a "contact list" or a "buddy list". The contact list may be stored on mobile device 130, and thus, control system 204 may receive the contact list from mobile device 130. Alternatively, the contact list may be stored in a network-based phonebook provided by mobile network 100 or a third party, and thus, control system 204 may access the network-based phonebook to obtain the contact list for the end user of mobile device 130.

In step 310, control system 204 identifies an adjusted charging rate for communicating with one or more of the contacts using a particular media type for a time period. In times where bandwidth usage reaches or exceeds a threshold, the service provider may adjust charging rates for a time period. For example, if bandwidth usage is below a threshold, then the service provider may adjust the charging rates downward to encourage communication. If bandwidth usage is above a threshold, then the service provider may adjust the charging rates upward to discourage communication and avoid overload conditions.

These charging rate adjustments are programmed into rating engine 110. Thus, control system 204 may access or query rating engine 110 to identify the adjusted charging rates. In accessing rating engine 110, control system 204 may first identify a location of a contact, and also identify a media type for communicating with the contact, as well as bandwidth usage data/threshold indicator. Control system 204 then generates a query that includes the location information and the media type, and transmits the query to rating engine 110. Rating engine 110 then responds to the query with an adjusted charging rate for the contact based on the suggested media type. Control system 204 may operate in a similar manner to identify an adjusted charging rate for a plurality of media types regarding an individual contact, and may also determine one or more charging rates for some or all of the contacts in the contact list of the end user. Some of the contacts may not be eligible for an adjusted charging rate. Thus, control system 204 identifies the adjusted charging rates for the eligible contacts in the contact list.

The charging rates may be adjusted to control the utilization of bandwidth within mobile network 100. For example, if the bandwidth usage of the region is below a threshold, then the adjusted charging rate may represent a reduced charging rate to encourage the end user of mobile device 130 to initiate a communication with a contact (using one of the media types). If the bandwidth usage of the region is above a threshold, then the adjusted charging rate may represent an increased charging rate to discourage the end user of mobile device 130 to initiate a communication with a contact (using one of the media types).

In step 312, interface system 202 provides the adjusted charging rate(s) for communicating with one or more of the contacts on a per media type basis. If the end user of mobile device 130 has a plurality of contacts in a contact list, then the end user may be able to view the adjusted charging rates for communicating with one or more of the contacts during a time period. The adjusted charging rates may be provided to the end user in the form of a text/multimedia message sent to mobile device 130. For example, the text/multimedia message may state "You can call Contact #1 for 2¢ per minute for the next two hours". The adjusted charging rates may alternatively be provided to the end user in their contact list. For example, the contact list may show the contact name and an associated charging rate for communicating with that contact per media type.

The adjusted charging rate may be provided to the end user in a variety of other ways. For example, rate notification system 106 may send a message to mobile device 130 responsive to identifying that mobile device 130 is located within a region of low bandwidth usage or high bandwidth usage. The message may include a notification that charging rates will be adjusted for a time period. The message may additionally or alternatively include an encoded service indication, such as a teleservice ID, which is configured to cause mobile device 130 to contact control system 204 over packet data network 108. For instance, the service indication may include a URL for a mobile web page which interface system 202 has generated for the end user of mobile device 130. The web page includes adjusted charging rates for communicating with one or more contacts of the end user. The service indication thus causes mobile device 130 to access the web page through the URL. Based on the service indication, mobile device 130 contacts rate adjustment system 106 over packet data network 108, and accesses the adjusted charging rates for communicating with one or more contacts in the contact list. Mobile device 130 may then display the adjusted charging rates to the end user. The end user may then decide whether or not to initiate a communication (via a particular media type) with one or more of the contacts based on the adjusted charging rates.

Interface system 202 may alternatively send the adjusted charging rates to mobile device 130 in a message, such as a text message, a multimedia message, etc.

Advantageously, a service provider may attempt to control bandwidth usage within mobile network 100 through the charging rate notifications described above. If bandwidth usage of voice calls is high in a region, then the service provider may notify mobile devices in this region of higher charging rates for initiating voice calls with one or more of the contacts in his/her contact list. This notification will hopefully discourage end users from placing voice calls for a time period, which avoids overloading mobile network 100. If bandwidth usage of text messaging is low in a region, then the service provider may notify mobile devices in this region of lower charging rates for initiating text messages with one or more of the contacts in his/her contact list. This notification will hopefully encourage end users to send text messages for a time period, which increases revenue to the service provider. Service providers can influence bandwidth usage across different regions of mobile network 100 to optimize overall bandwidth utilization and maximize revenues.

Example

Figure 4:
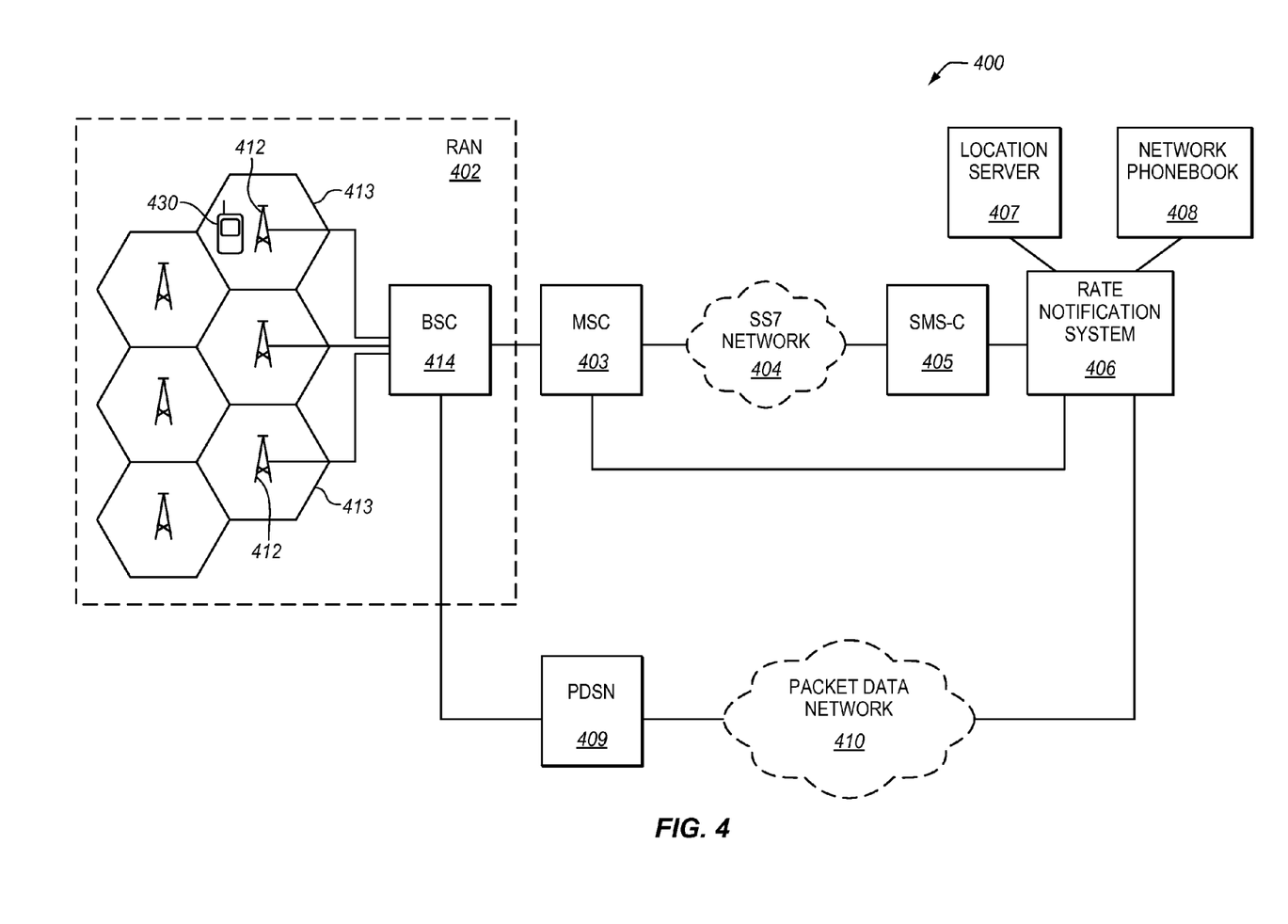
FIG. 4 illustrates a CDMA network in an exemplary embodiment.

FIG. 4 illustrates a CDMA network 400 in an exemplary embodiment. Those skilled in the art will appreciate that similar network architectures may be developed for GSM, IMS, and LTE networks. CDMA network 400 includes a Radio Access Network (RAN) 402, a Mobile Switching Center (MSC) 403, an SS7 network 404, a Short Message Service Center (SMS-C) 405, a rate notification system 406, a location server 407, and a network phonebook 408. RAN 402 includes a plurality of base stations 412 each providing a service area referred to as a cell 413. Base stations 412 are each connected to base station controller (BSC) 414, which is operable to manage and control the functions of base stations 412.

Rate notification system 406 is an application server and may be a stand-alone network element or integrated within a network charging system (which provides subscriber account management and a rating engine). As in the prior embodiment, rate notification system 406 is able to identify one or more regions within CDMA network 400 having low bandwidth usage or high bandwidth usage. Rate notification system 406 is further able to notify one or more mobile devices within the region(s) of an adjusted charging rate for communications via different media types (e.g., voice call, email, text message, multimedia message, Instant Message (IM)). A more thorough description of the operation of rate notification system 406 is described in relation to FIG. 5.

Base station controller 414 also connects to a packet data network 410 through Packet Data Serving Node (PDSN) 409. Rate notification system 406 is also connected to packet data network 410. Thus, rate notification system 406 is able to communicate with mobile devices in CDMA network 400 through the SS7 network 408 or the packet data network 410.

Figure 5:
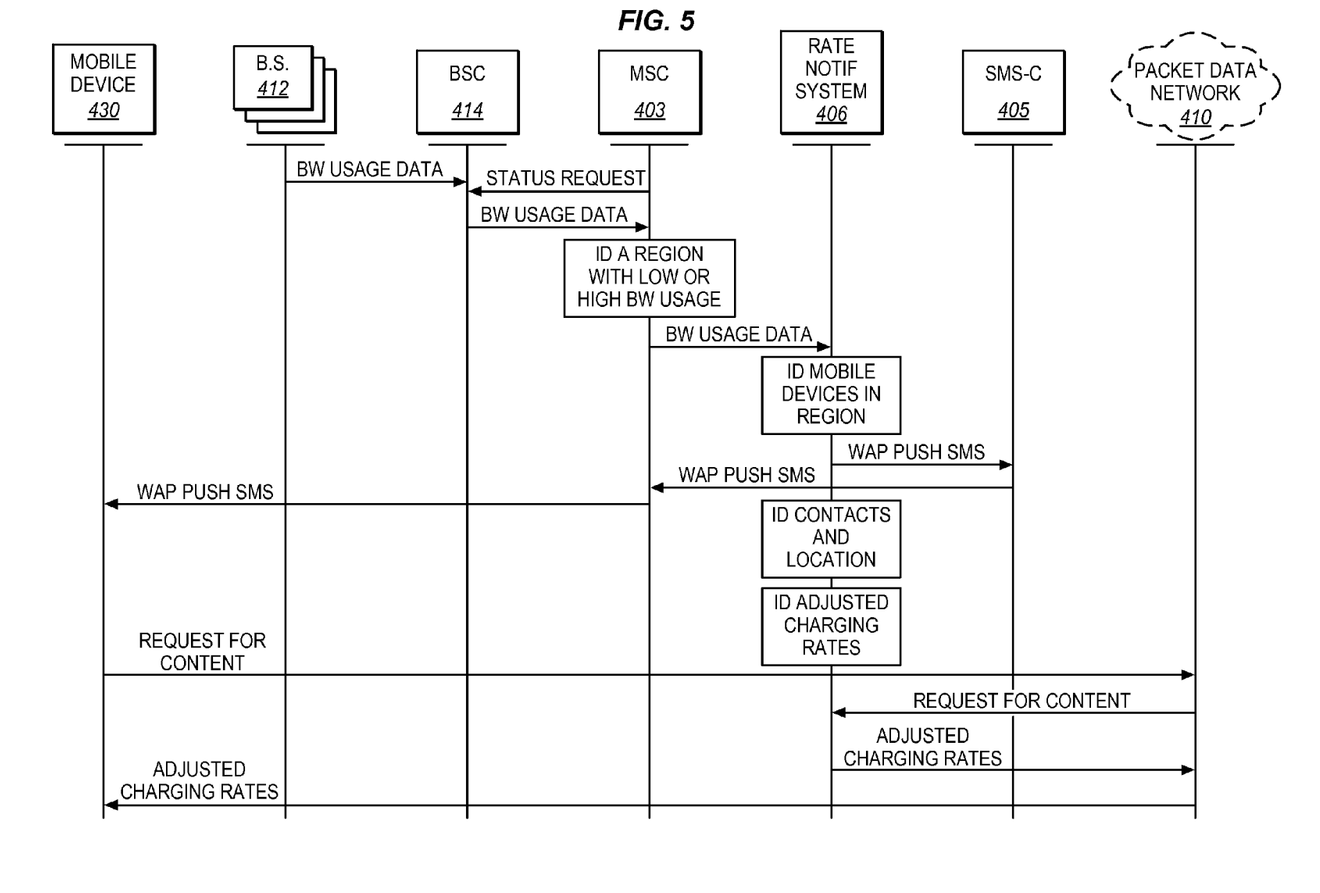
FIG. 5 is a message diagram illustrating notification of adjusted charging rates in an exemplary embodiment.

FIG. 5 is a message diagram illustrating notification of adjusted charging rates in an exemplary embodiment. Assume for this embodiment that mobile communications are occurring within CDMA network 400. For example, mobile devices (such as mobile device 430) within the service area of RAN 402 may be placing or receiving voice calls, exchanging email, exchanging text messages, exchanging multimedia messages, exchanging IM's, etc. Base station controller (BSC) 414 collects data from base stations 412 that indicates local utilization of bandwidth within CDMA network 400 by mobile devices registered within a region. For example, the data may be localized to a particular region or zone indicated by a cell ID/sector ID. To retrieve the data, MSC 403 (or rate notification system 406) may send a status request to base station controller 414. Base station controller 414 then sends a report of the bandwidth usage data to MSC 403. The report may also include an indication as to which mobile devices are presently within a region or zone.

MSC 403 processes the bandwidth usage data and compares it with thresholds (minimum or maximum) of mobile traffic to identify one or more regions that exceed a threshold. If a region is identified that exceeds a threshold, then MSC 403 determines whether a charging rate adjustment applies to these regions. For example, MSC 403 may process rules or policies defined by the service provider to determine whether a region qualifies for a charging rate adjustment based on the bandwidth usage in the region. These rules and policies are defined by the service provider and are programmed into rating engines in CDMA network 400. For instance, MSC 403 may include a rating engine that is programmed with the rules or policies defining charging rate adjustments. If a region of high or low bandwidth usage qualifies for a charging rate adjustment, then MSC 403 transmits the bandwidth usage data for the region to rate notification system 406.

Rate notification system 406 receives the bandwidth usage data, and identifies the region in CDMA network 400 having bandwidth usage that exceeds the threshold. Rate notification system 406 also determines whether this region of CDMA network 400 qualifies for a charging rate adjustment. If the region qualifies, rate notification system 406 identifies one or more mobile devices 430 located within the region. Rate notification system 406 then initiates a process to broadcast a notification message to these mobile devices 430. To do so, rate notification system 406 sends a (Wireless Application Protocol) WAP push SMS to SMS-C 405 along with a list of mobile devices within the region. The WAP push SMS may include a text message indicating that a charging rate will be adjusted for a time period. For example, the text message may state "Rates may be adjusted in your area for the next two hours".

The WAP push SMS also includes a unique SMPP service type describing an action or actions that a mobile device should execute. SMS-C 405 maps the service type in the WAP push SMS to a unique teleservice ID, and includes the teleservice ID in the WAP push SMS, SMS-C 405 then broadcasts the WAP push SMS to mobile devices 430 in the region of CDMA network 400 based on the list.

For the mobile devices 430 in the region, rate notification system 406 identifies one or more contacts for the end users of the mobile devices. For example, rate notification system 406 identifies contacts for an end user of mobile device 430. To do so, rate notification system 406 access network phonebook 408 that stores a contact list for the end user of mobile device 430, and downloads the contact list for the end user. Rate notification system 406 then accesses location server 407 to identify the location of one or more of the contacts in the contact list. Rate notification system 406 identifies the location of the contacts in order to determine whether an adjusted charging rate applies for one or more of the contacts. Rate notification system 406 then identifies an adjusted charging rate for communicating with one or more of the contacts by accessing a rating engine. For example, MSC 403 may include a rating engine for CDMA network 400, and rate notification system 406 may access the rating engine in MSC 403 to identify the adjusted charging rates for the contacts.

In this embodiment, charging rate adjustments are determined on a per media type basis. For example, if the bandwidth usage data indicates that voice call utilization is low in this region, then a charging rate adjustment may be made for voice calls. If the bandwidth usage data indicates that text message utilization is low in this region, then a charging rate adjustment may be made for text messages. Thus, rate notification system 406 identifies an adjusted charging rate per media type for communicating with one or more of the contacts.

Rate notification system 406 may include an application that provides a WAP service. The WAP service generates mobile web pages for the end users of the mobile devices in the region. For example, rate notification system 406 may generate a mobile web page for the end user of mobile device 430, such as in Wireless Markup Language (WML). The web pages include as content the adjusted charging rates per media type for communicating with one or more of the contacts of the end user. Thus, when a mobile device accesses the web page, the end user is able to view the adjusted charging rates.

When a mobile device 430 receives the WAP push SMS that was broadcast, a client application (i.e., a WAP browser) running on mobile device 430 processes the teleservice ID that was encoded in the SMS message. In response to processing the teleservice ID, the client application may give the end user the option of accessing WAP content, which comprises the adjusted charging rates. The teleservice ID may include a link to a WAP address. Thus, if the end user selects the option to access the WAP content, the client application sends a request for content over packet data network 410 to the WAP address to access rate notification system 406. The WAP address is for the web page generated for the end user of mobile device 430. In response to the request for content, rate notification system 406 transmits the web page to mobile device 430, which displays the content to the end user. The web page provided by rate notification system 406 will include adjusted charging rates for applicable media types (e.g., voice calls, SMS, MMS, email, IM, etc).

Figure 6:
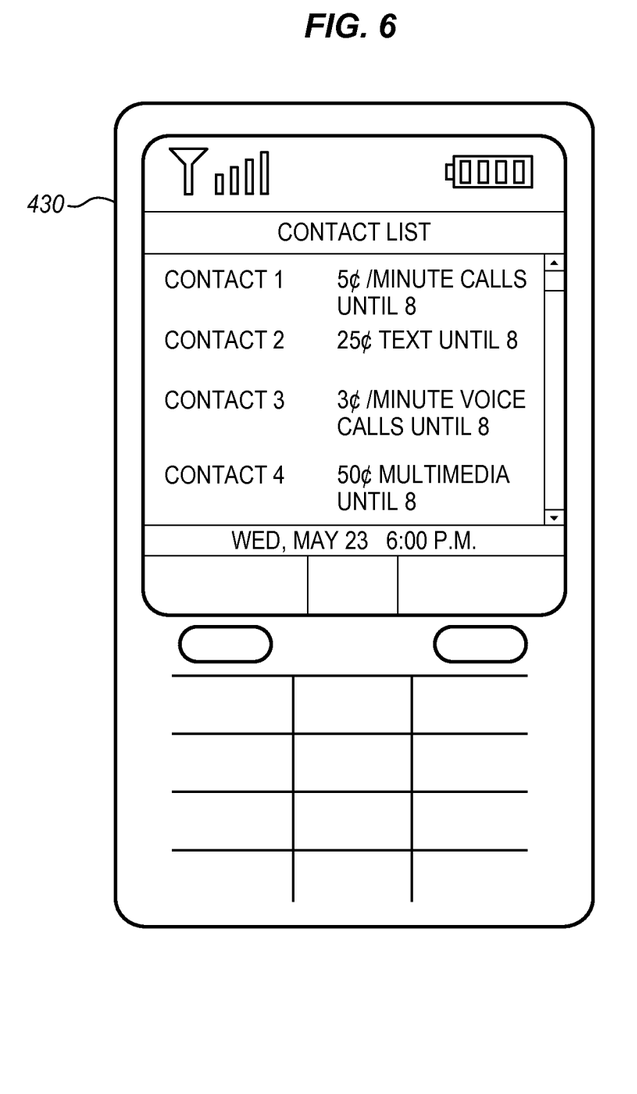
FIG. 6 illustrates adjusted charging rates displayed to an end user in an exemplary embodiment.

FIG. 6 illustrates the adjusted charging rates displayed to the end user in an exemplary embodiment. In this example, four contacts are displayed along with an adjusted charging rate per media type for a time period. For Contact 1, the adjusted charging rate for voice calls is 5¢ per minute until 8 p.m. (two hours). For Contact 2, the adjusted charging rate for text messaging is 25¢ until 8 p.m. For Contact 3, the adjusted charging rate for voice calls is 3¢ per minute until 8 p.m. For Contact 4, the adjusted charging rate for multimedia messaging is 50¢ until 8 p.m.

Assume for this example that the adjusted charging rates illustrated in FIG. 6 represent discounts in the charging rates. By notifying the end user of mobile device 430 of the discounted rates, the end user may be motivated to place a voice call to Contact 1 or Contact 3, send a text message to Contact 2, or send a multimedia message to Contact 4. Other end users in this region of CDMA network 400 may be likewise motivated to initiate communications with one or more of their contacts. Thus, in a region of otherwise low bandwidth utilization, the service provider of CDMA network 400 can increase bandwidth usage by notifying the end users of the discounted charging rates.

In an alternative example, rate notification system 406 may provide the charging rate (whether is a normal rate or an adjusted rate) for all contacts in the contact list. Thus, the end user may view the applicable charging rate for each contact in the contact list.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A rate notification system, comprising:
an interface system operable to receive bandwidth usage data for a mobile network, wherein the bandwidth usage data includes media type descriptions indicating the media used to consume bandwidth of the mobile network; and
a control system operable to identify a region within the mobile network having a bandwidth usage that exceeds a threshold for at least one media type based on the bandwidth usage data, to identify a mobile device located in the region, to receive a contact list of an end user from the mobile device, to identify at least one contact of the end user of the mobile device from the contact list, and to identify an adjusted charging rate for communicating with the at least one contact using the at least one media type for a time period;
the interface system further operable to provide the adjusted charging rate to the mobile device.

2. The rate notification system of claim 1 wherein:
the interface system is further operable to generate a mobile web page that includes the adjusted charging rate for communicating with the at least one contact using the at least one media type.

3. The rate notification system of claim 2 wherein:
the control system is further operable to broadcast a message to the mobile device in the region that includes an encoded service indication; and
the encoded service indication is programmed to cause the mobile device to access the mobile web page over a packet data network.

4. The rate notification system of claim 3 wherein:
the message broadcast to the mobile device further includes a notification that charging rates will be adjusted for a time period.

5. The rate notification system of claim 1 wherein:
the interface system is further operable to send a text/multimedia message to the mobile device indicating the adjusted charging rate.

6. The rate notification system of claim 1 wherein:
the control system is further operable to identify a network-based phonebook of the end user, and to identify the at least one contact of the end user from the network-based phonebook.

7. The rate notification system of claim 1 wherein:
the control system is further operable to identify a location of the at least one contact, and to query a rating engine based on the location of the at least one contact and the at least one media type to identify the adjusted charging rate for communicating with the at least one contact using the at least one media type.

8. A method, comprising:
receiving bandwidth usage data for a mobile network, wherein the bandwidth usage data includes media type descriptions indicating the media used to consume bandwidth of the mobile network;
identifying a region within the mobile network having a bandwidth usage that exceeds a threshold for at least one media type based on the bandwidth usage data;
identifying a mobile device located in the region;
receiving a contact list of an end user from the mobile device;
identifying at least one contact of the end user of the mobile device from the contact list;
identifying an adjusted charging rate for communicating with the at least one contact using the at least one media type for a time period; and
providing the adjusted charging rate to the mobile device.

9. The method of claim 8 wherein providing the adjusted charging rate to the mobile device comprises:
generating a mobile web page that includes the adjusted charging rate for communicating with the at least one contact using the at least one media type.

10. The method of claim 9 wherein providing the adjusted charging rate to the mobile device comprises:
broadcasting a message to the mobile device in the region that includes an encoded service indication;
the encoded service indication is programmed to cause the mobile device to access the mobile web page over a packet data network.

11. The method of claim 10 wherein the message broadcast to the mobile device further includes a notification that charging rates will be adjusted for a time period.

12. The method of claim 8 wherein providing the adjusted charging rate to the mobile device comprises:
sending a text/multimedia message to the mobile device indicating the adjusted charging rate.

13. The method of claim 8 wherein identifying at least one contact of an end user of the mobile device comprises:
identifying a network-based phonebook of the end user; and
identifying the at least one contact of the end user from the network-based phonebook.

14. The method of claim 8 wherein identifying an adjusted charging rate for communicating with the at least one contact using the at least one media type comprises:
identifying a location of the at least one contact; and
querying a rating engine based on the location of the at least one contact and the at least one media type to identify the adjusted charging rate for communicating with the at least one contact using the at least one media type.

15. A mobile network, comprising:
a rate notification system operable to receive bandwidth usage data for the mobile network, to process the bandwidth usage data to identify a region within the mobile network where bandwidth usage exceeds a minimum bandwidth usage or a maximum bandwidth usage, and to notify a mobile device located in the identified region that a charging rate will be adjusted for a time period;
the rate notification system is further operable to receive a contact list of an end user from the mobile device, to identify at least one contact of the end user of the mobile device from the contact list, to identify an adjusted charging rate per contact per media type, and to provide the adjusted charging rate per contact per media type to the mobile device.

16. The mobile network of claim 15 wherein:
the rate notification system is further operable to broadcast a text/multimedia message to the mobile device to notify the end user that the charging rate will be adjusted for the time period.

17. The mobile network of claim 16 wherein:
the rate notification system is further operable to insert a service indicator in the text/multimedia message; and
the mobile device, in response to processing the service indicator in the text/multimedia message, is operable to access a mobile web page in the rate notification system over a packet data network;
wherein the mobile web page indicates the adjusted charging rate per contact per media type.

18. The mobile network of claim 17 wherein:
the service indicator in the text/multimedia message comprises a Wireless Application Protocol (WAP) push service identifier.

* * * * *